United States Patent [19]
Paletta et al.

[11] Patent Number: 6,058,978
[45] Date of Patent: May 9, 2000

[54] POLYMERIC PIPE DEFORMER AND METHOD FOR RELINING EXISTING PIPELINES

[76] Inventors: Stephen Paletta, 333 N. State Rd., Briarcliff Manor, N.Y. 10510; Brian George, 4033 Estabrook Dr., Annandale, Va. 22003; David A. Fletcher, 680 Bedford Rd., Armonk, N.Y. 10504

[21] Appl. No.: 08/682,389

[22] Filed: Jul. 17, 1996

Related U.S. Application Data

[63] Continuation of application No. 08/399,458, Mar. 7, 1995, abandoned, which is a continuation-in-part of application No. 08/212,069, Mar. 11, 1994, Pat. No. 5,525,049.

[51] Int. Cl.⁷ .................................................. F16L 55/162
[52] U.S. Cl. ........................ 138/98; 138/97; 138/DIG. 7
[58] Field of Search .......................... 138/98, 97, DIG. 7; 405/150.1; 264/36, 269

[56] References Cited

U.S. PATENT DOCUMENTS

| | | | |
|---|---|---|---|
| 489,950 | 1/1893 | Harrington . | |
| 3,382,121 | 5/1968 | Sherlock | 156/165 |
| 3,462,825 | 8/1969 | Pope et al. | 29/451 |
| 3,489,220 | 1/1970 | Kinley | 166/277 |
| 3,876,351 | 4/1975 | Takada | 425/62 |
| 3,894,328 | 7/1975 | Jansson | 29/235 |
| 4,207,130 | 6/1980 | Barber | 156/244 |
| 4,350,548 | 9/1982 | Zenbayashi et al. | 138/98 |
| 4,394,202 | 7/1983 | Thomas et al. | 156/94 |
| 4,410,391 | 10/1983 | Thomas et al. | 156/244 |
| 4,504,171 | 3/1985 | Florence, Jr. | 405/154 |
| 4,537,531 | 8/1985 | Diefenthaler | 405/174 |
| 4,780,163 | 10/1988 | Haneline, Jr. et al. | 138/98 |
| 4,863,365 | 9/1989 | LeDoux et al. | 425/343 |
| 4,867,921 | 9/1989 | Steketee, Jr. | 264/36 |
| 4,985,196 | 1/1991 | LeDoux et al. | 264/156 |
| 4,986,951 | 1/1991 | LeDoux et al. | 264/516 |
| 5,034,180 | 7/1991 | Steketee, Jr. | 264/516 |
| 5,048,174 | 9/1991 | McGuire | 29/451 |
| 5,091,137 | 2/1992 | Ledoux | 264/516 |
| 5,092,756 | 3/1992 | Gau et al. | 425/343 |
| 5,114,634 | 5/1992 | McMillan et al. | 264/28 |
| 5,167,056 | 12/1992 | McGuire | 29/234 |
| 5,167,258 | 12/1992 | Rice | 138/98 |
| 5,186,987 | 2/1993 | Imoto et al. | 528/34.5 |
| 5,213,727 | 5/1993 | Gargiulo | 264/40.3 |
| 5,214,835 | 6/1993 | McGuire | 29/451 |
| 5,244,624 | 9/1993 | Steketee, Jr. | 264/516 |
| 5,256,342 | 10/1993 | McMillan et al. | 264/28 |
| 5,265,648 | 11/1993 | Lyon | 138/98 |
| 5,334,429 | 8/1994 | Imoto et al. | 428/36.2 |
| 5,335,872 | 8/1994 | Clubbs | 242/68.5 |
| 5,342,570 | 8/1994 | LeDoux et al. | 264/566 |
| 5,346,658 | 9/1994 | Gargiulo | 264/40.3 |
| 5,368,669 | 11/1994 | Maine et al. | 156/158 |
| 5,368,809 | 11/1994 | Steketee, Jr. | 264/516 |
| 5,374,174 | 12/1994 | Long, Jr. | 425/11 |
| 5,385,173 | 1/1995 | Gargiulo | 138/98 |
| 5,395,472 | 3/1995 | Mandich | 156/287 |
| 5,447,665 | 9/1995 | Steketee, Jr. | 138/97 |
| 5,487,411 | 1/1996 | Goncalues | 138/97 |

*Primary Examiner*—Denise L. Ferensic
*Assistant Examiner*—James F. Hook
*Attorney, Agent, or Firm*—Ostrager Chong Flaherty & Onofrio

[57] ABSTRACT

A method and apparatus for relining, repairing or reconstructing existing infrastructure pipeline systems that are new, structurally deficient or experiencing an excessive amount of exfiltration or infiltration, or converting new or damaged pipelines into dual-containment pipelines. A plurality of stock, high density polyethylene lining pipes having a cylindrical cross-section with a diameter up to 36 inches and lengths of 40–50 feet are joined together to a job specific length. The lining pipe is then heated to its flex temperature and gradually deformed to a reduced diameter. At the job site, the deformed lining pipe is inserted into the existing pipe and a controlled, pressurized environment is created therein for a period of time dependent on the pipe's length. Pressurized steam is first inserted to provide heat and internal pressure to expand the pipe. Then, compressed air is inserted to cool the pipe while maintaining the internal pressure to complete the expansion and set the pipe. When converting to dual-containment pipelines, the deformed pipe will have a plurality of spacers attached thereon such that the existing and deformed pipes are axially aligned and have an annular space therebetween.

21 Claims, 7 Drawing Sheets

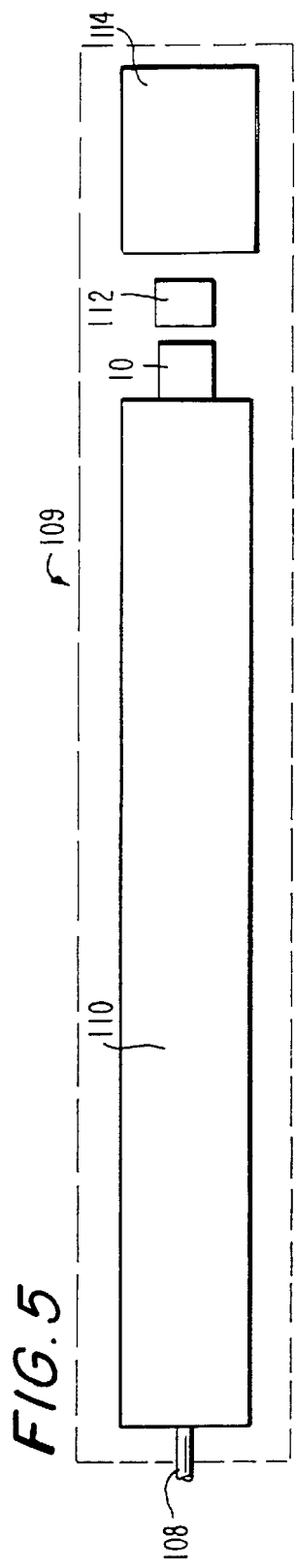
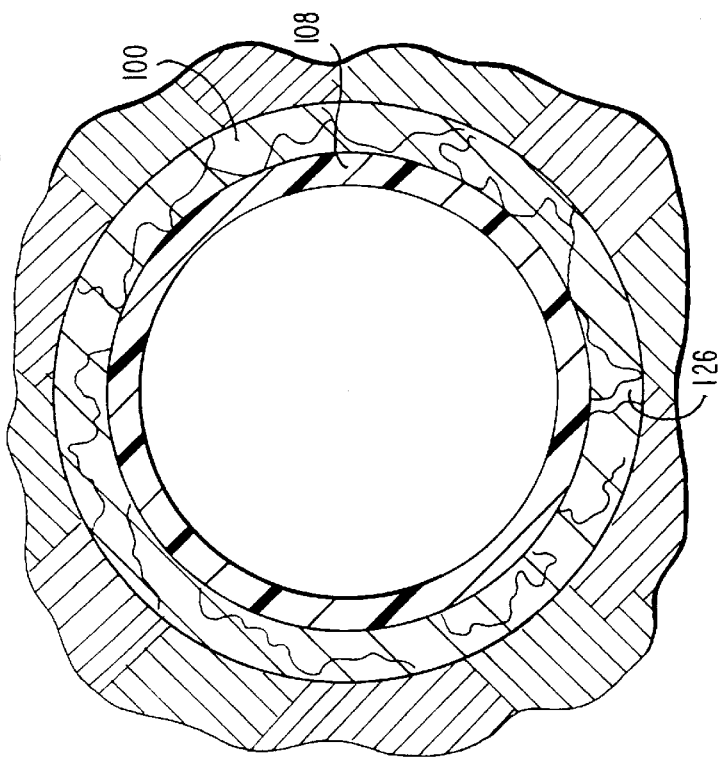
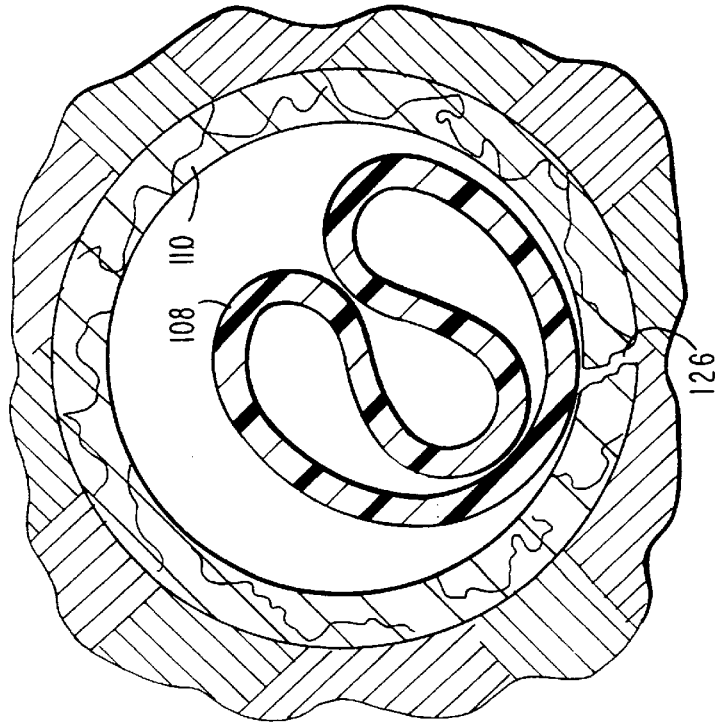

POLYMERIC PIPE DEFORMER AND METHOD FOR RELINING EXISTING PIPELINES

This application is a continuation of application Ser. No. 08/,399,458 filed on Mar. 7, 1995 now abandoned which is a continuation-in-part of Ser. No. 08/212,069 filed on Mar. 11, 1994, which issued as U.S. Pat. No. 5,525,049 on Jun. 11, 1996 now abandoned.

FIELD OF INVENTION

This invention relates to a method and apparatus for lining or reconstructing new or damaged pipelines in situ and converting existing single-containment pipelines to dual-containment pipelines. More particularly, it is concerned with an efficient and economical method and apparatus for deforming a resilient lining pipe into a reduced overall diameter, inserting the deformed pipe into an existing pipeline and reforming the lining pipe.

BACKGROUND OF INVENTION

The deterioration of underground pipelines in industrial and municipal settings is an infrastructure illness that continually grows due to a wide range of harmful influences. For example, chemical wastes, root intrusion, abrasive substances, earthquakes and flooding all have a corrosive effect on underground pipeline systems that causes leakage and infiltration and threatens our environment.

Recent federal and state laws have mandated that all industrial waste pipelines must be replaced with dual-containment pipe or that a leak detection system must be installed and activated on each line section. Insofar as there is no cost-effective leak detection system that can be implemented for an existing single-containment pipeline, the only solution is to install a dual-containment pipeline. A dual-containment pipeline consists of an outer pipe and an inner pipe having a diameter less than the outer pipe and being centered therein. An equal annular space is provided between the pipes to allow any flow outside of the inner pipe to be detected immediately.

Re-laying an entire new network of either single- or double-containment pipes to replace existing pipelines is not a feasible solution for overcoming the problems associated with corroded or defective pipelines because it is costly, disruptive and slow. The cost of excavation alone in most industrial areas is excessive due to the contaminated soil surrounding the existing pipelines. Further, it is desirable to minimize destruction of surface features so as not to disturb local residences, businesses and utilities. Therefore, there is a need in the art to establish a quick and inexpensive, no dig solution for rehabilitating existing pipelines and for converting single-containment pipelines to a dual-containment system.

Reconstructing defective pipelines in situ by inserting a lining pipe therein and leaving no annular space therebetween is the preferred method for overcoming the above-identified problems. However, known relining methods cannot accommodate the diversity of pipeline materials and non-standardized diameters presently used. Typical pipelines comprise such materials as vitrified clay, reinforced concrete, cast iron, ductile iron, asbestos, cement, steel or even hollow logs. Reconstruction costs therefore vary depending upon pipeline size, composition and location.

Lining existing pipelines in situ with inner pipes having a non-cylindrical shape is known in the prior art. Tight-fitting pipe lining inserts are conventionally used to enhance a pipeline's strength. Typical methods for lining pipelines include the steps of forming flexible piping or tubing (e.g. polyethylene) having a fold therein at an extrusion plant, holding the tube in this folded state, inserting the deformed tube into existing pipelines and releasing the tube so that it returns to its original cylindrical form. As representative of such art, reference may be had to U.S. Pat. No. 3,894,328 to Jansson. Known lining pipes are typically produced at high temperatures having a U-shape, rather than being extruded in cylindrical form and then being deformed to a reduced diameter. This increases relining costs because of the necessity for special extrusion equipment and for high energy to reform the pipe after insertion into an existing pipeline.

The prior art also shows deforming lining pipes at the site of a host pipe for insertion therein. For example, U.S. Pat. No. 5,091,137 to Ledoux discloses deforming a thermoplastic extrudate (i.e. a lining pipe) into a U-shape to facilitate insertion into the pipe to be lined. In FIG. 1 of the patent, the deforming apparatus comprises a pair of fixed positioning rollers 14 and 16 located perpendicular to one another and a pair of adjustable positioning rollers 18 and 20 also located perpendicular to one another, and opposite rollers 14 and 16. The thermoplastic extrudate is deformed by applying heat and passing it through a motor-driven deforming or penetration wheel. When fully inserted, the lining pipe is pressurized and heated to return the pipe to its original round shape.

U.S. Pat. No. 4,207,130 to Barber shows a method of lining pipes including the steps of extruding the lining pipe on site, deflecting the pipe, holding the pipe in its deflected state, feeding the deflected pipe into a host pipe and releasing the hold on the pipe so that it returns to its original form. The deforming apparatus has a deflecting roller carried by a frame and folding rollers. A plastic extrudate passes through a cold water spray to set the plastic material. The deflecting roller then deflects the upper central portion of the tube so that it takes up a horseshoe type configuration and rollers press the sides of the horseshoe cross section together. The lining pipe is propelled through the forming apparatus by a motor driven roller.

Another approach of the art is exemplified by U.S. Pat. Nos. 5,114,634 and 5,256,342 to McMillan et al. which show reducing the diameter of a lining for insertion into a host pipe by passing an elastomeric liner pipe through five sets of rollers. Each of the five sets of rollers defines a 360 degree region of contact with the liner and provides a progressively smaller liner-receiving opening to reduce the diameter of the lining pipe.

SUMMARY OF THE INVENTION

Accordingly, it is a broad object of the invention to provide an improved pipe lining method for rehabilitating new, damaged or deteriorating infrastructure pipeline systems in situ.

Another broad object of the invention is to provide a trenchless method for repairing or reconstructing existing pipelines that are structurally deficient or experiencing an excessive amount of exfiltration or infiltration without extensive cost, prolonged schedules or constant disruptions.

A more specific object of the invention is to provide a method and apparatus for reconstructing existing pipelines having a broad range of sizes and being made from a broad range of materials.

Another object of the invention is to provide an apparatus and method for deforming resilient lining pipes either in a coiling plant or at the site of a defective pipeline.

A still further object of the invention is to provide a method and apparatus for converting single-containment pipelines into dual-containment pipelines in situ.

The present invention achieves these objectives by providing an economical and efficient method and apparatus for reducing the diameter of a stock, thermoplastic lining pipe either on-site or at a coiling plant, inserting the deformed lining pipe into a new or defective host pipe and reforming the lining pipe to its original shape to fit tightly therein. The method and apparatus is effective for relining applications (i.e. no annular space between the pipes) and for converting existing pipelines from single- to double-containment pipelines (i.e. approximately equal annular space between the pipes).

In accordance with the preferred method, the host pipeline is cleaned and measured. A plurality of stock, thermoplastic lining pipes having a cylindrical cross-section are joined together to create a length greater than the host pipe's length. The lining pipe's diameter is reduced to about 65–70% of its full dimensional size by heating the outside surface of the lining pipe to the lowest temperature in its flex-temperature range and forming a longitudinal depression therein. The lining pipe is deformed without disturbing the pipe's structural integrity (i.e. its circular memory). Tape is then wrapped around the lining pipe to maintain its deformed shape and the pipe is coiled for transport.

At the relining location, the deformed lining pipe is positioned over an existing access point, attached to a winch cable that has been strung through the host pipe and pulled directly into the host pipe. When completely inserted, the lining pipe is subjected to a controlled, pressurized environment to return the lining pipe to its original round shape. Preferably, pressurized steam is applied to raise the lining pipe's temperature above the lowest temperature in the flex-temperature range and to increase the internal pressure. Compressed air is then applied to cool the pipe while maintaining the pressure to allow the lining pipe to expand into any large void areas in the host pipe and set in that position.

The preferred deforming apparatus comprises a winch-propelled system of adjustable rollers mounted to and contained within a portable frame. A lining pipe enters the unit from an entry side of the frame and is guided to a series of adjustable conveying rollers. As the lining pipe is conveyed through the unit, an adjustable deforming bar, comprising a series of narrow rollers, applies a gradually increasing pressure along the length of the pipe to form a longitudinal depression therein. The pipe's position is stabilized to prevent it from rotating during deformation. The pipe receives its final round shape by two pairs of adjustable, concave rollers. The first pair lifts the sides of the deformed pipe and the second pair squeezes the sides to reduce the diameter of the pipe. It will be recognized that such a mechanical arrangement will provide manufacturing and process efficiencies over known deforming apparatus and methods.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF DRAWINGS

FIG. 5 is a diagram showing a deforming line incorporating the deforming apparatus of FIG. 1 in accordance with a preferred embodiment of the invention.

FIG. 7 is a cross-sectional view of a deformed lining pipe after insertion into a defective host pipe in situ in accordance with a preferred embodiment of the invention.

FIG. 8 is a cross-sectional view of a reconstructed host pipe having a lining pipe which has been reformed to its original circular shape in accordance with a preferred embodiment of the invention.

DESCRIPTION OF PREFERRED EMBODIMENT

For purposes of the description, the terms "host pipe", "lining pipe", and "site" shall have the following meanings. Host pipe shall refer to an existing pipeline system, disposed in situ or above the ground, which may be new and in good condition, structurally deficient, or experiencing an excessive amount of exfiltration or infiltration. Lining pipe shall refer to a resilient, polymeric pipe liner which may be deformed, inserted into the host pipe and reformed to its original shape. Site shall refer to the location of the host pipe.

The first step in relining a host pipe 100 is to clean and inspect the host pipe 100 to ensure that all residual material is removed so that nothing comes between the host pipe 100 and an inserted lining pipe 108. Any existing access point 116, such as a manhole or man-made access pit, may be used to access the host pipe 100 during all steps in the relining process. Advantageously, the method is trenchless, that is, it does not require unsightly excavations that reroute traffic, disrupt businesses and services or irritate homeowners. This enables a relining project to be accomplished in a number of hours instead of days and the existing pipelines remain in service.

Figure 6A:
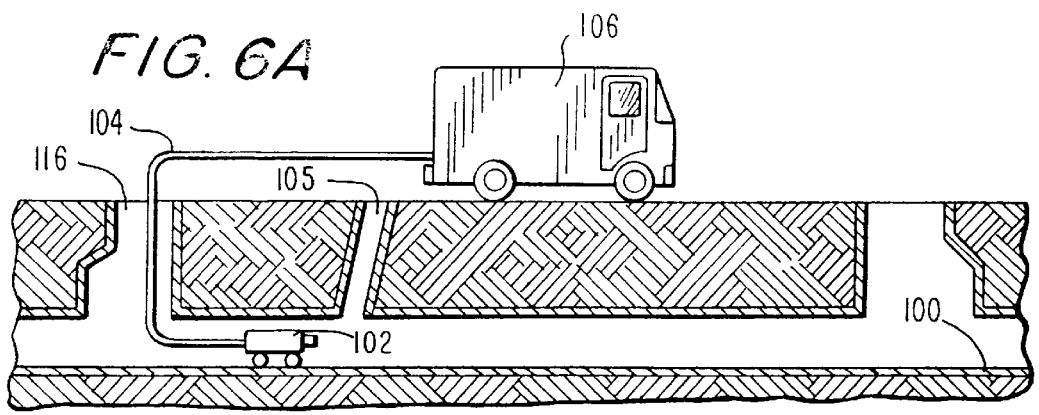
FIGS. 6A–6D are diagrams showing the progression of process steps for relining a defective host pipe in situ with a deformed lining pipe in accordance with a preferred embodiment of the invention.

Precise measurements are then taken of the host pipe's 100 length and inside diameter, as well as the exact location of each service connection 105. FIG. 6A shows a remote-controlled camera 102 inserted into the host pipe 100 for taking these measurements. The camera 102 is controlled from an operator station 106 via a video cable 104. Any suitable camera or measuring device is sufficient. However, precise and accurate measurements have been obtained using the Proview P&T 460 pan/tilt pipe inspection camera commercially available from Cues, Orlando, Fla. This camera enables the operator to view the entire inner surface of the host pipe 100, including hard to see laterals, open joints, cracks, and any infiltration.

A plurality of pre-cut, stock, thermoplastic lining pipes having a plant manufactured cylindrical cross-section are then obtained from an extrusion plant according to the measurements taken. The cost of obtaining stock lining pipes and deforming them on site or at a coiling plant in accordance with this invention is significantly less than deforming the pipes in line with an extruder, as is common in the prior art. Additionally, less time and energy is necessary to return a stock lining pipe to its original round shape after insertion into the host pipe because the pipe is manufactured to be round and not deformed.

The lining pipe's outside diameter and wall thickness shall be fabricated to a size that when installed, will nearly fit the host pipe's internal circumference. The lining pipe's standard dimension ratio shall be based on the evaluation of design considerations such as internal pressure, flow capacity, condition of existing host pipe, and external loads including hydrostatic pressure and/or static and dynamic earth loads. Preferably, the lining pipe's outside diameter should be approximately equal to the host pipe's inner diameter less 1.5%–3.0%. The lining pipe 108 should also have a length of 10–60 feet, preferably 40–50 feet, and a wall thickness of ⅛"–2" depending on the lining pipe's size and the in situ conditions of the host pipe. For example, host pipes under high pressure generally require a lining pipe having a thick wall and host pipes in good structural condition, but subject to infiltration or exfiltration, may be lined with lining pipes having thinner walls.

Lining pipes for use with this invention are preferably manufactured from an extra high molecular weight (EHMW), high density polyethylene (HDPE) pipe compound. Other suitable materials include polypropylene and medium density polyethylene (MDPE). The lining pipe should have a low modulus of elasticity, allowing the pipe to be repeatedly squeezed to the point where the walls meet and returned to near roundness. A suitable lining pipe is the Poly Pipe Greenview PE3408 HDPE pipe commercially available from Poly Pipe Industries, Gainesville, Tex. This pipe meets the general requirements of ASTM-1248 "Standard Specifications of Polyethylene Plastics, Molding and Extrusion Material" and has the characteristics shown in Table 1. The specification sheet listing all characteristics of the Greenview pipe is incorporated herein by reference.

TABLE 1

| Density | 0.948 gm/cm³ |
| --- | --- |
| Flexural Modulus | 136,000 psi |
| Tensile Strength | 3500 psi |
| Melting Point | 261° F. |
| Elastic Modulus | 113,000 psi |
| Vicat Softening Temp. | 255° F. |
| Molecular Weight | 330,000 as per the Gel Perineation Chromotography determination procedure |

HDPE is advantageous because it has a minimal life of fifty (50) years which ensures that the reconstructed pipeline will be environmentally sound for many years. HDPE is flexible and non-reactive, making it adaptable to existing pipelines comprising a broad range of materials and sizes, and to a wide variety of applications. For example, the process of the invention may be used to line host pipes made from any of the following materials: vitrified clay, reinforced concrete, cast iron, ductile iron, asbestos cement and steel; and may be used for any one of the following applications: sanitary sewer lines, storm sewer lines, potable water lines, chemical and industrial sewers, chemical process lines, slurry pipelines, raw matter lines or natural gas transmission and distribution lines. These lists are illustrative and not limiting in any sense. HDPE also has a low coefficient of friction, which allows the pipe's post-lining flow capacity to return to 100% or more of the host pipe's original flow.

Lining pipes having the above specifications may be shipped to a manufacturing (i.e. coiling) plant or they may be shipped directly to the relining site. In general, host pipes having diameters less than 18 inches may be relined with a lining pipe that is deformed either at the site or at a coiling plant. When deformed at a coiling plant, a tape is wrapped around the lining pipe after it is deformed and the lining pipe is coiled for easy transport to the site. However, coiling is not feasible for lining pipes greater than 18 inches. Therefore, host pipes having diameters greater than 18 inches must be relined with lining pipes deformed at the site. The preferred process of this invention can reline host pipes having a diameter up to 36 inches, whereas prior art relining methods are capable of relining host pipes having a maximum diameter of 18 inches.

Regardless of where the lining pipe is deformed, a plurality of 40–50 foot lining pipes are joined together to form one long lining pipe according to job specification. The final length of the lining pipe should be approximately 6 to 8 feet longer than the host pipe's length. The long lining pipe is assembled by joining the plurality of 40–50 foot pipes by the preferred process known as butt fusion.

FIG. 5 shows a production line 109 for deforming pipes to a reduced diameter and coiling them for shipment to a relining site. Preferably, the lining pipe's diameter is reduced to about 65–70% of its full dimensional size by heating the pipe to its flex-temperature and applying a gradually increasing pressure along the length of the pipe to form a longitudinal depression therein. The flex-temperature is the lowest temperature at which the lining pipe will become workable without disturbing the pipe's structural integrity (i.e. without removing the pipe's circular memory). The flex-temperature is determined by the pipe's wall thickness, but for typical applications ranges from 100° F.–150° F. Generally, the flex-temperature increases as the wall thickness increases. Table 2 provides approximate flex-temperatures for the preferred HDPE liner pipe at various wall thicknesses.

TABLE 2

| | Thickness (inches) | | | | | |
| --- | --- | --- | --- | --- | --- | --- |
| | ⅛ | ¼ | ⅜ | ½ | ⅝ | >¾ |
| Flex-Temp. (° F.) | 110 | 125 | 138 | 142 | 148 | 150 |

The lining pipe should not be heated beyond the flex-temperature for any particular wall thickness and preferably no higher than 150° F. for any thickness. Deforming at higher temperatures disturbs the structural integrity of the pipe (i.e. the higher the temperature, the more the lining pipe loses its circular memory). Therefore, pipes deformed at temperatures higher than the flex-temperature are more difficult to reform to their original shape and require more energy to do so.

The lining pipe 108 is gradually heated by passing it through a flex-temperature chamber 110. The preferred chamber comprises a hollow, cylindrical heating unit which has an inner diameter greater than the outside diameter of the lining pipe 108. A heat source (not shown) provides steam to the chamber, however electric heat can also be used. The chamber 110 is disposed in a horizontal direction so that the lining pipe 108 may be easily inserted and conveyed therethrough. This arrangement gradually heats the outer surface of the lining pipe 108 as it passes through the chamber 110 and reaches the deforming apparatus 10. Alternatively, heat may be applied internally into the pipe 108 and allowed to saturate through the pipe's wall to its outer surface.

When the lining pipe 108 reaches the exit end of the flex-temperature chamber 110, the temperature of the outer surface is the flex temperature and the pipe is ready to be deformed by deforming apparatus 10. The deforming apparatus 10 is the same apparatus that is taken to the site to deform cylindrical lining pipes having a diameter greater than 18".

A preferred embodiment of the deforming apparatus 10 is shown in FIGS. 1–4. The apparatus 10 is a self-contained, portable unit that deforms a resilient polymeric pipe without using electrical power so that the lining pipe has a reduced diameter. By mechanically reducing the diameter of the lining pipe without electrical power, deformation of the lining pipe can be achieved economically at the site or in a coiling plant. The apparatus 10 is contained in a portable steel frame 12 mounted on a single rear axle 14 having two rear wheels 16. A front wheel 18 is mounted to frame 12 at an entry position of the lining pipe and is used for steering apparatus 10. When used in a coiling plant as shown in FIG. 5, the deforming apparatus 10 is stationary and the lining pipe 108 is pulled therethrough. When the apparatus 10 is brought to the lining site, a winch cable is attached to hook element 21 located at the pipe entry position. The winch cable pulls apparatus 10 over the lining pipe enabling the pipe to be propelled therethrough.

Figure 2:
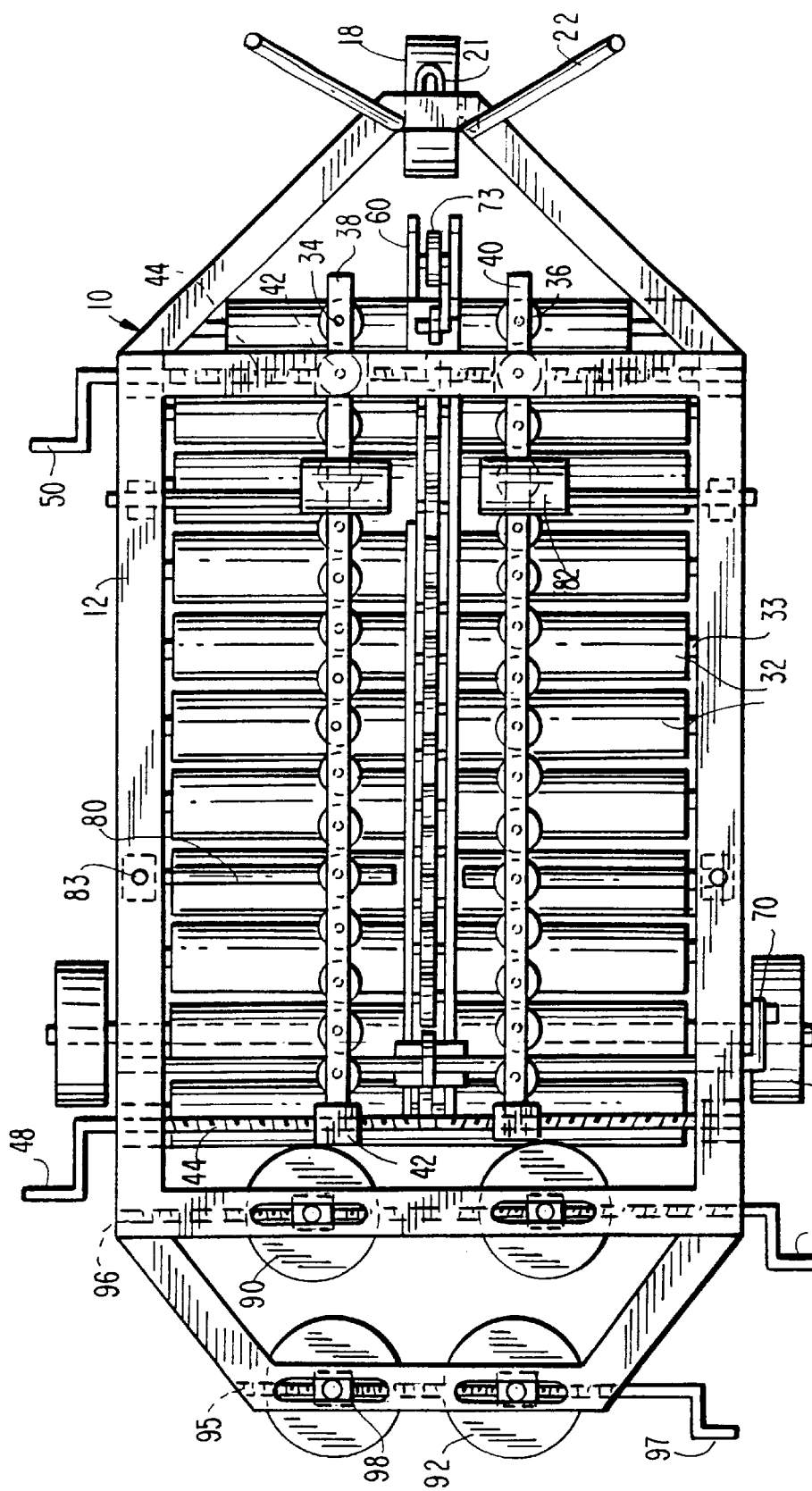
FIG. 2 is a top plan view of the preferred deforming apparatus shown in FIG. 1.
Figure 4:
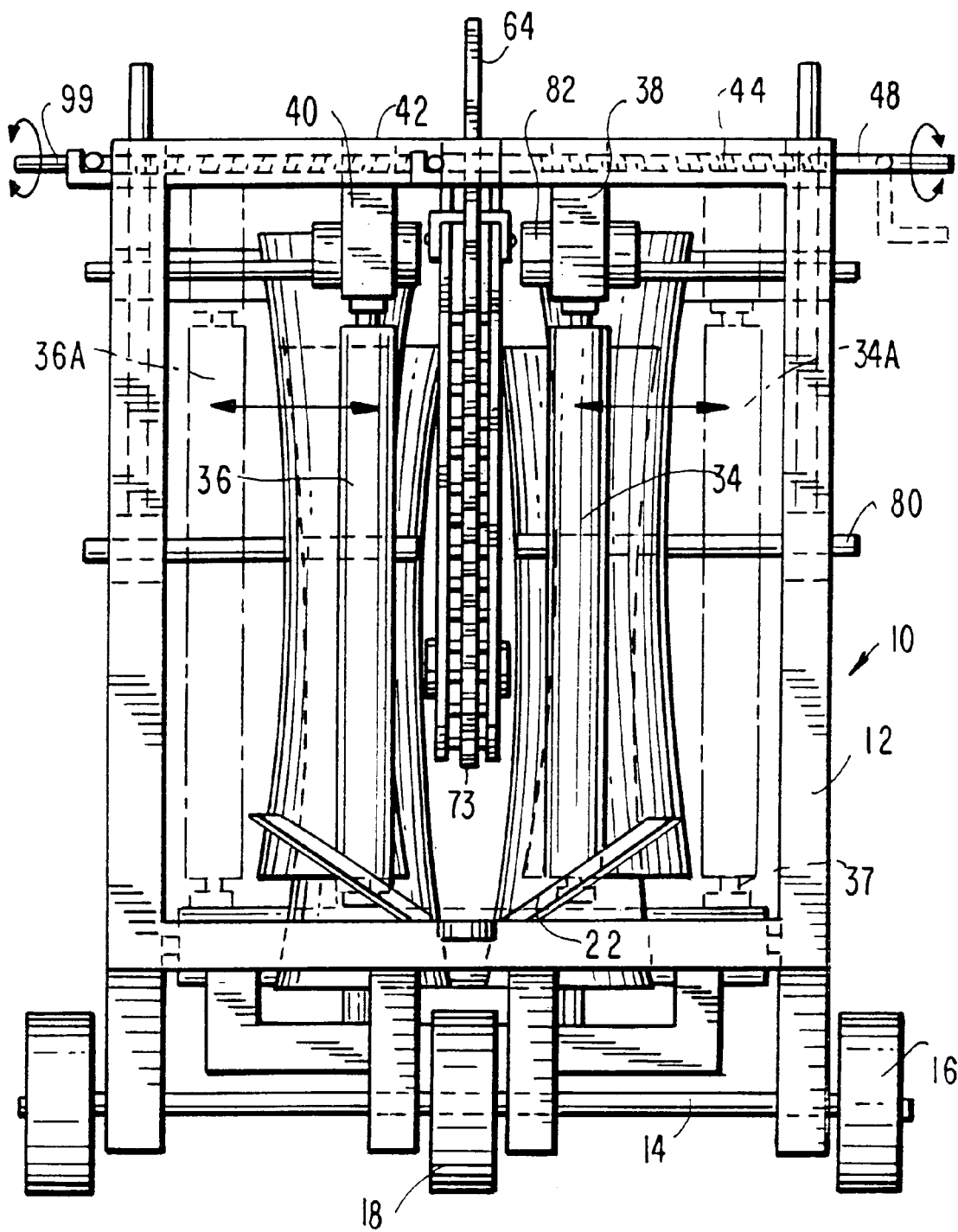
FIG. 4 is a front plan view of the preferred deforming apparatus shown in FIG. 1.

The pipe enters the apparatus through a pair of guide rollers 22 attached to frame 12 in a V-shape at the pipe entry position (see FIGS. 2 and 4). Guide rollers 22 straddle the pipe to support and guide it toward the center of a system of adjustable conveyor rollers 30, which support and convey the pipe through apparatus 10. Conveying system 30 includes a plurality of horizontal conveying rollers 32 rotatably mounted through a central shaft 33 to the bottom horizontal members of frame 12. Rollers 32 rotate in a horizontal direction to convey and support the lining pipe. In FIG. 2, conveying system 30 further comprises two sets of vertical conveying rollers 34, 36 which surround the lining pipe to ensure that the pipe is conveyed in a straight horizontal path. Each set of vertical conveying rollers 34, 36 is rotatably mounted through a central shaft 37 to roller mounts 38, 40. Roller mounts 38, 40 are attached to frame 10 so that rollers 34, 36 rotate in a vertical direction and allow the pipe to be conveyed between the two sets 34, 36.

To allow pipes of variable sizes to be conveyed and deformed, vertical rollers 34, 36 are adjustable in a horizontal direction. In FIG. 2, both sets of rollers 34, 36 have a block 42 attached to the top of roller mounts 38, 40. Two hand screw shafts 44 run through an elongated channel in the top of frame 12 at the front and the rear of apparatus 10. The screw shafts 44 also run through block 42. Hand cranks 48, 50 are rotatably coupled to screw shafts 44 to provide means for rotating the screw shaft 44. Block 42 acts as a nut so that when screw shaft 44 is rotated, block 42 moves horizontally along the shaft, thus moving vertical rollers 34, 36 therewith. In FIG. 4, vertical rollers 34, 36 are shown in phantom 34A, 36A to indicate the adjustment made to allow a lining pipe having a larger diameter to be conveyed through apparatus 10.

Mounted centrally within the deforming apparatus 10 is a deforming bar 60, shown in FIGS. 1–4. Deforming bar 60 is positioned at an angle to gradually converge with horizontal rollers 32 near the exit position so that a gradually increasing pressure is applied to a polymeric lining pipe as it is conveyed through apparatus 10. Deforming bar 60 is attached to front support bar 61 at the entry position and to rear support bar 64 near the exit position of apparatus 10. To allow variable sizes of pipes to be deformed, support bars 61, 64 are adjustably mounted to frame 12 so that deforming bar 60 can be adjusted in a vertical direction. See FIG. 1. Support bars 61, 64 include a series of locking holes 66. In the upper part of frame 12 there are mounting holes 68, 69 which correspond to locking holes 66, depending on the height at which the deforming bar 60 is set. Locking pins 70, 72 fit through mounting holes 68, 69 and locking holes 66 to lock the deforming bar 60 in place. The rear support bar 64 provides a range of motion for deforming bar 60 from about 1 inch above horizontal roller 32 to about 4 inches above horizontal rollers 32.

Deforming bar 60 is provided with a plurality of spaced narrow rollers 73 rotatably mounted through a central shaft 74 to deforming bar 60. Deforming rollers 73 are configured to gradually deflect the pipe to form a longitudinal depression therein. As the lining pipe is conveyed and deformed, there is a tendency for the pipe to bulge higher on one side of deforming bar 60 than on the other side, causing the pipe to rotate. Therefore, anti-rotational stops 80, 82 are provided to stabilize the position of the pipe during deformation. Two types of anti-rotational stops are shown in FIGS. 2 and 4. Stop 80 is a pair of horizontal bars located on either side of deforming bar 60. Stop 82 is a pair of horizontal rollers also located on both sides of deforming bar 60. Both anti-rotational stops 80, 82 are positioned to apply constant pressure to the top sides of the lining pipe on both sides of the deforming bar and biased against the direction of pipe movement to maintain it in aligned engagement with deforming bar 60.

Figure 1:
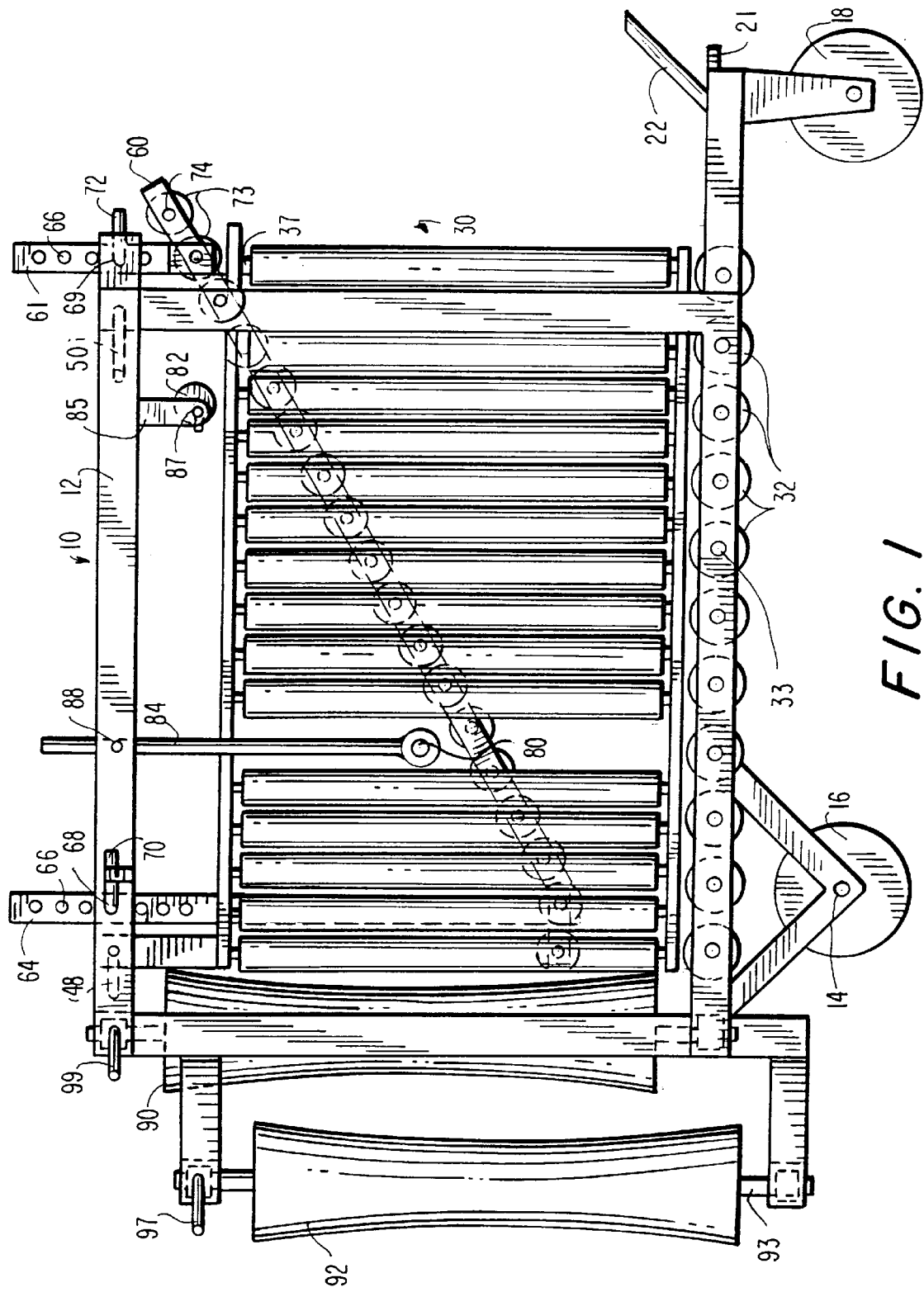
FIG. 1 is a side view of a deforming apparatus in accordance with a preferred embodiment of the invention.

Anti-rotational stops 80, 82 are adjustably mounted to the top of frame 12 and depend downwardly toward the pipe. The stops 80, 82 are adjustable in a vertical direction to provide additional support to the lining pipe during deformation. In FIG. 1, anti-rotational stop 80 is mounted on support rod 84. Support rod 84 fits through a set screw bore 83 in frame 12 so that it can slide up and down. A set screw 88 is loosened to allow movement of the support rod 84 in a vertical direction and tightened to lock the support rod 84 to frame 12 at the proper height. Anti-rotational stop 82 is adjustably mounted to support bracket 85, which attaches to and depends downward from frame 12. A set screw 87 is loosened to allow stop 82 to move in a vertical direction and tightened to lock stop 82 to support rod 85 at the proper height.

Figure 3:
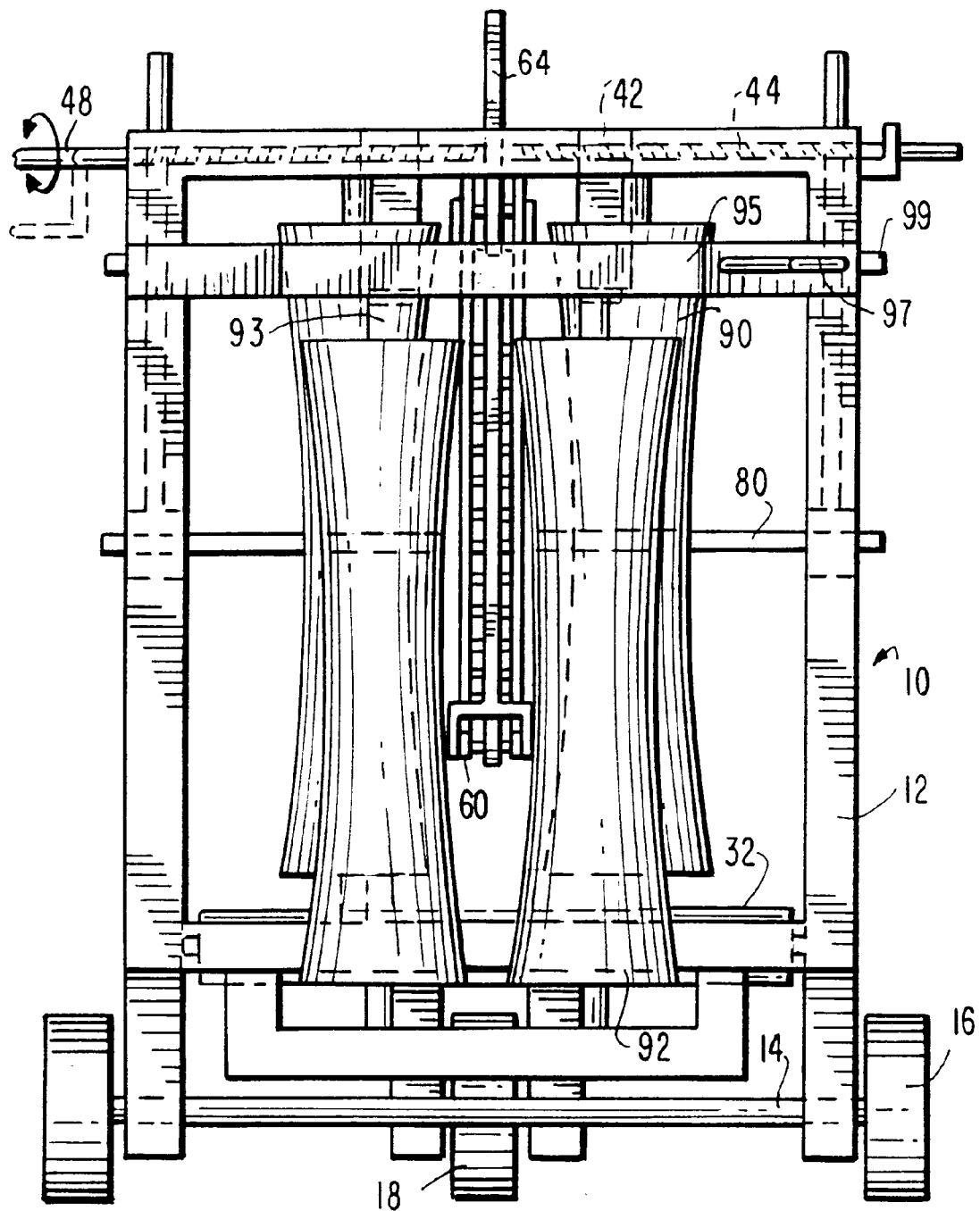
FIG. 3 is a rear plan view of the preferred deforming apparatus shown in FIG. 1.

After the pipe is deformed, it passes through shaping rollers 90, 92. Shaping rollers 90, 92 include two pairs of concave rollers rotatably mounted through a central shaft 93 to frame 12 so that they rotate in a vertical direction. In FIGS. 2 and 3, the second pair 92 has its rollers spaced closer together than first pair 90 to provide a pipe squeezing function. Both pairs of shaping rollers are adjustably mounted to frame 12 to allow for pipes of variable sizes to obtain their final shape. Concave shaping rollers 90, 92 adjust in a horizontal direction similar to vertical conveying rollers 34, 36. Concave shaping rollers 90, 92 each have block 98 attached to the top of the roller. Hand screw shafts 95, 96 run through blocks 98 and through an elongated slot in frame 12. Hand cranks 97, 99 are coupled to screw shaft 95, 96 to provide means for rotating screw shafts 95, 96 and adjusting shaping rollers 90, 92.

Preferred rollers for use in the invention are fabricated of metal, plastic or other conventional materials having a polyurethane coating and are commercially available from Precision Urethane Inc., Heampstead, Tex. Advantageously, the use of a polyurethane coating provides a resiliency during the deforming operation to maintain the integrity of the lining pipes (i.e. to prevent breaking or cracking). Dimensions of the rollers will vary depending on the diameter of the lining pipe to be deformed. Generally, lining pipes having large diameters will require rollers having large diameters. The concavity of shaping rollers 90, 92 must also be greater as the diameter of the lining pipe increases. For example, Table 3 shows preferred roller specifications for deforming a lining pipe having a diameter between 8 inches and 15 inches.

TABLE 3

| Roller Length | Diameter | Length | Shaft Diam. | Shaft |
|---|---|---|---|---|
| Conveyors (32, 34, 36) | 12 in. | 24 in. | 1.5 in. | 28 in. |
| Shaping Rollers 90, 92 | 6 in.[1] | 18 in. | 1 in. | 22 in. |
| Deforming Rollers 73 | 4 in. | 2 in. | | |

[1]Middle diameter of concave shaping rollers 90, 92 is 1.5 inches.

The mechanical components of the deforming apparatus 10 have now been fully described, and it will be advantageous for a full understanding of the invention, to discuss the apparatus in terms of function. The lining pipe is placed on guide rollers 22 so that it is fed toward conveying system 30. Hand cranks 48, 50 are then rotated to move vertical conveyors 34, 36 inward or outward so that the lining pipe fits therebetween and deforming bar 60 is adjusted to the proper height by removing locking pins 70, 72, raising or lowering support bars 61, 61 and replacing locking pins 70, 72. The lining pipe or the apparatus is then pulled by a winch, depending on whether deforming is taking place on site or at a coiling plant, thus forcing the lining pipe to be conveyed through the apparatus. As the pipe is conveyed, deforming bar 60 applies a gradually increasing pressure to the pipe so that the pipe collapses, forming a longitudinal depression therein. Advantageously, no electrical power is required to form the depression. To prevent rotation of the pipe during deformation, anti-rotational stops 80, 82 are adjusted to the proper height to apply constant pressure to the pipe on both sides of the depression.

After the pipe is deformed, it passes through two pairs of shaping rollers 90, 92 at the exit position. Hand crank 99 is used to adjust the first set of shaping rollers 90 to have a sufficient distance therebetween to lift the sides of the deformed pipe. The second set of shaping rollers 92 is adjusted by hand crank 97 so that rollers 92 have a sufficient distance therebetween to squeeze the sides of the pipe together to form a cylindrical pipe having a reduced diameter. Typical pipes deformed by the deforming apparatus will have a new diameter measuring 65–70% of their original diameter.

In the coiling plant 109 of FIG. 5, when the deformed pipe exits apparatus 10, it then passes through a taping station 112 where it is continuously wrapped with a high tensile tape to secure the pipe in its deformed state. Preferably a tape should be used which can withstand pressure up to 360 p.s.i. Taping may be accomplished manually or by an automatic taping machine. This restraint is necessary because the lining pipe maintains its circular memory even after it has been deformed due to the low flex-temperatures used for deformation. If the pipe is not restrained in its new deformed shape, it will automatically return to its original circular shape or some small variance thereof.

After taping, the deformed lining pipe passes to a coiling station 114 where it is coiled by conventional coiling methods that are commonly used for small diameter (i.e. less than 18 inches) circular pipe. The coiler may be electrically or hydraulically driven and the pipe may be coiled anytime after the pipe is deformed, i.e., continuously after taping or at a later date. The coiler also provides motive force via a cable for conveying the lining pipe 108 through the flex-temperature chamber 110, the deforming apparatus 10 and the taping station 112. The speed at which the coiler spins, and the lining pipe is conveyed, is related to the time needed to raise the lining pipe's temperature to the flex-temperature. The temperature of the deformed pipe is then reduced to its ambient temperature and stored until shipment.

Figure 6B:
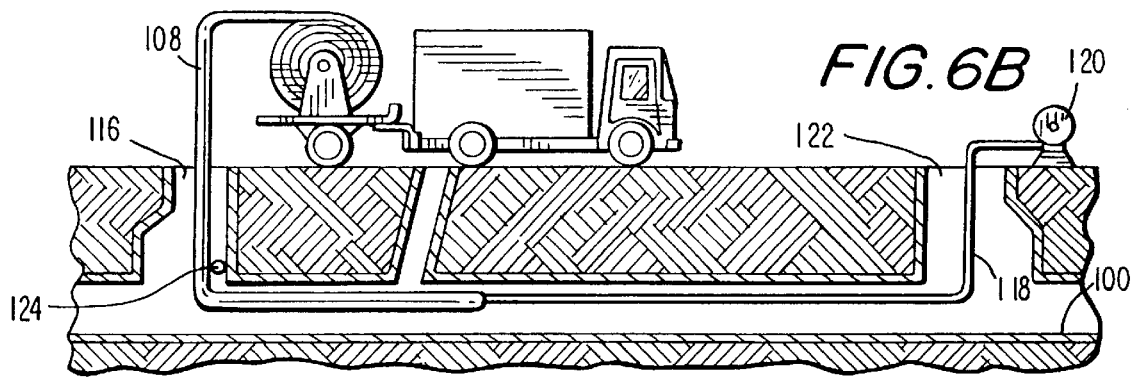

FIG. 6B shows a coil 110 of deformed lining pipe 108 after it has been transported from the coiling plant 109 to the relining site. The deformed lining pipe 108 is positioned over an existing access point 116. If the pipe is deformed at the site, then the deforming apparatus 10 is positioned near the access point 116 and the liner is pulled directly from the deforming apparatus into the host pipe 100.

The deformed lining pipe 108 is then pulled into the host pipe 100 by a winch cable 118 which has been strung through the host pipe 100 and attached to the lining pipe's 108 end by conventional attachment means. Before the lining pipe is pulled into the host pipe, the retention tape is cut off. Motive force is provided to the cable 118 and lining pipe 108 by a hydraulic winch 120, or other suitable winding device, disposed above the site's surface near a second access point 122. One or more rollers 124 are provided between the lining pipe 108 and the edge of the first access point 116 to reduce the strain on the lining pipe 108 as well as to protect the outside area of the host pipe 100 as the lining pipe 108 is inserted into the host pipe 100.

FIG. 7 shows a deformed lining pipe 108 when it is completely inserted into the host pipe 100. At this point, the lining pipe is subjected to a controlled, pressurized environment to reform the deformed lining pipe 108 to its original circular shape as shown in FIG. 8. All cracks 126 in the host pipe 100 will now be covered and no longer present a problem.

Figure 6C:
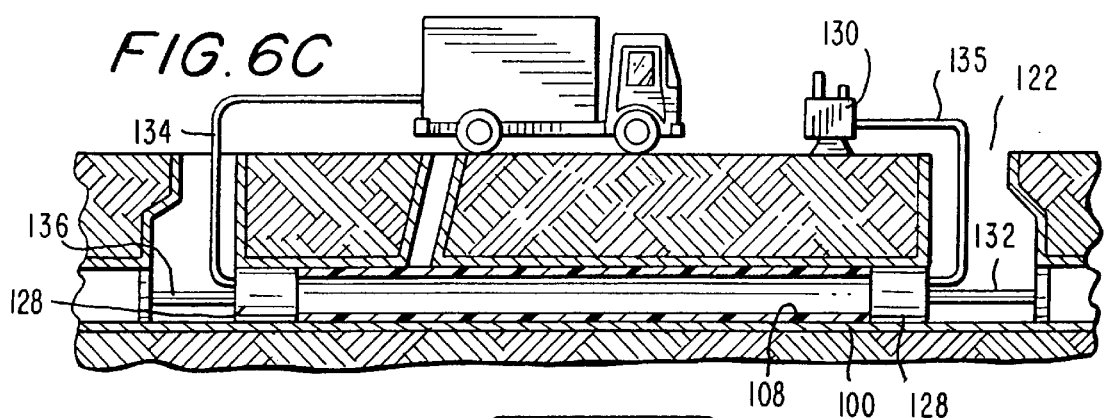

Referring to FIG. 6C, the process for reforming the deformed pipe comprises creating a closed pressure environment inside the lining pipe 108 for a specified period of time using only variations in temperature to reform, expand and set the pipe in its final position. Since the length of the lining pipe 108 is greater than the host pipe's 100 length, the lining pipe's terminal ends extend past the host pipe's terminal ends. The lining pipe's ends are heated to a workable state to allow end plugs 128 to be inserted therein for sealing off the lining pipe 108. The end plugs 128 may comprise any shape capable of tightly sealing the ends of the lining pipe 108 including, but not limited to, a round or cone shape. The end plugs 128 have an inlet with a fitting for attaching a hose 134, 135 thereto.

A steam generation unit 130 above the ground near the second access point 122 provides steam via a hose 135 through a pressure valve 132 and into the sealed host pipe 100. At the other end of the pipes is an exhaust hose 134 and another pressure valve 136 to maintain the pressure inside the pipe at the desired level.

Pressurized steam is inserted into the lining pipe 108 to raise the temperature of and increase the pressure in the lining pipe 108. The time necessary for reforming the lining pipe will vary depending on wall thickness and diameter. However, it is desirable to maintain a pressure of 20 psi inside the lining pipe 108 for a minimum of 45 minutes per 100 linear feet. The lining pipe's 108 temperature should be raised above the flex temperature, preferably to a minimum of 110% of the pipe's flex temperature. This heat, in conjunction with the internal pressure, enables the lining pipe 108 to return to its original round shape without using any mechanical device to remove the deformation. The specific combination of heat and pressure also expands the lining pipe 108 so that it fits tightly inside the host pipe and moves into any large void areas or cracks 126. The fit is so tight that each joint or offset is visible and dimples are created in each existing service connection 138.

Figure 6D:
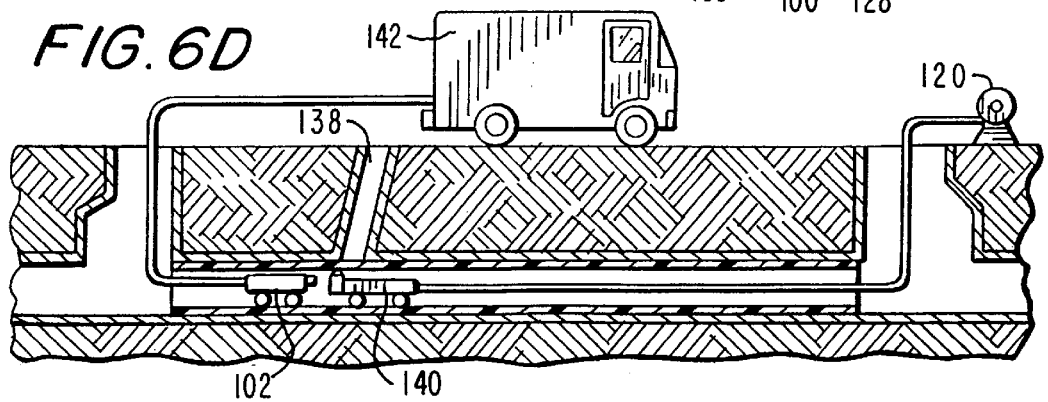

The lining pipe 108 is then cooled beyond its ambient temperature to set it in its final expanded position. The steam generator 130 is switched to produce compressed air up to 30 psi, preferably 25 psi. The compressed air is inserted into the lining pipe 108 via hose 135 to maintain the pressure inside the lining pipe. The cooling is complete when the lining pipe's temperature decreases below 80° F., at which time the pressure can be eliminated and the end plugs 128 removed. Referring to FIG. 6D, the lined host pipe is brought back into service by reopening the service connections 138 with a remote-controlled cutting device 140 and camera 102 controlled from a station 142 above the ground. A preferred cutting device is the Kangaroo lateral cutter manufactured by Cues, Orlando, Fla.

Figure 9:
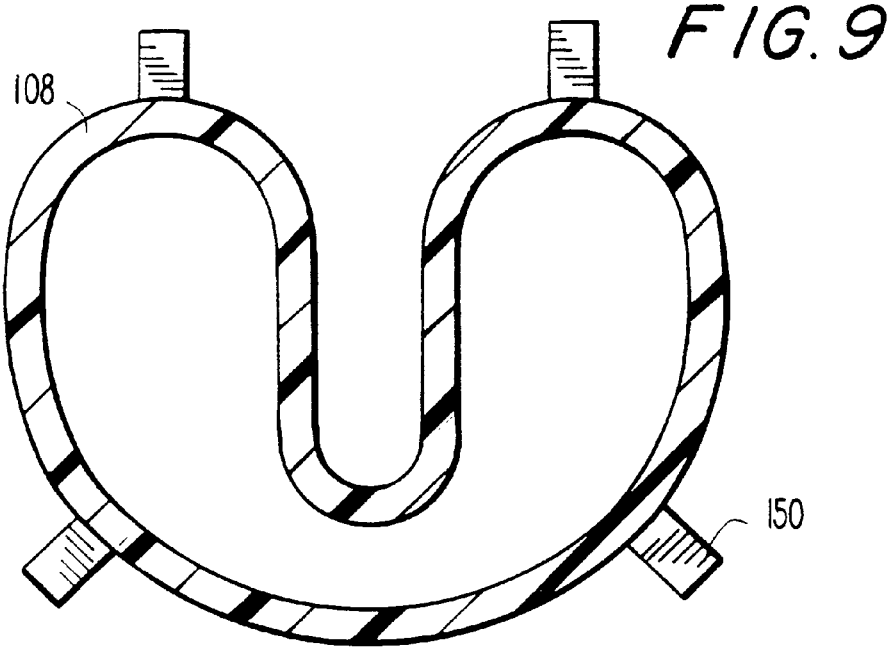
FIG. 9 is a cross sectional view of a deformed polymeric pipe with spacers before insertion into a host pipe in accordance with a preferred embodiment of the invention.

The above-described method can also be used to convert single-containment pipe to dual-containment pipe. FIG. 9 shows a suitable lining pipe 108 for convert a single-containment pipe to a dual-containment pipe. A plurality of spacer members 150 project from the outer surface of lining pipe 108. In the preferred embodiment, spacer members 150 are made of polyethylene having characteristics similar to that of lining pipe 108. Spacer members 150 having a length of approximately six inches are extrusion welded onto the outer surface of lining pipe 108 and spaced every five feet in an axial direction. In the circumferential direction, spacer members 108 should be distributed at equiangular intervals from each other. When lining pipe 108 is inserted into a host pipe 100 and reformed to its original cylindrical shape using the above-described process, the dual-containment pipe 152, shown in FIG. 5B, is formed. The lining pipe 108 is axially aligned within the host pipe 100 and equal annular spaces are formed therebetween.

From the foregoing, it will be appreciated that the present invention provides a method and apparatus which achieve the objects stated heretofore. An improved method is provided for economically and efficiently relining and reconstructing existing pipelines in situ. Host pipes comprising a broad range of sizes and materials can be reconstructed or converted to double-containment pipes in a number of hours rather than days without large excavations. A deforming apparatus is also provided which includes a series of adjustable rollers and conveyor systems that deform a thermoplastic pipe by applying a gradually increasing pressure to the pipe to form a longitudinal depression therein.

Numerous modifications are possible in light of the above disclosure. For example, although a deforming bar 60 comprising a series of rollers is shown in the drawings, a single deforming roller is within the scope of this invention. Similarly, the configuration of conveyor rollers 30 can be modified to any system that provides support and conveys the pipe through the apparatus. Although the preferred embodiment does not require the use of electrical power, it is within the scope of the invention to provide an electric power driven arrangement of rollers. Further, although the anti-rotational stops 80, 82 are shown to be rollers in the drawings, any horizontal bar that will provide upper stabilization is within the scope of this invention.

Figure 10:
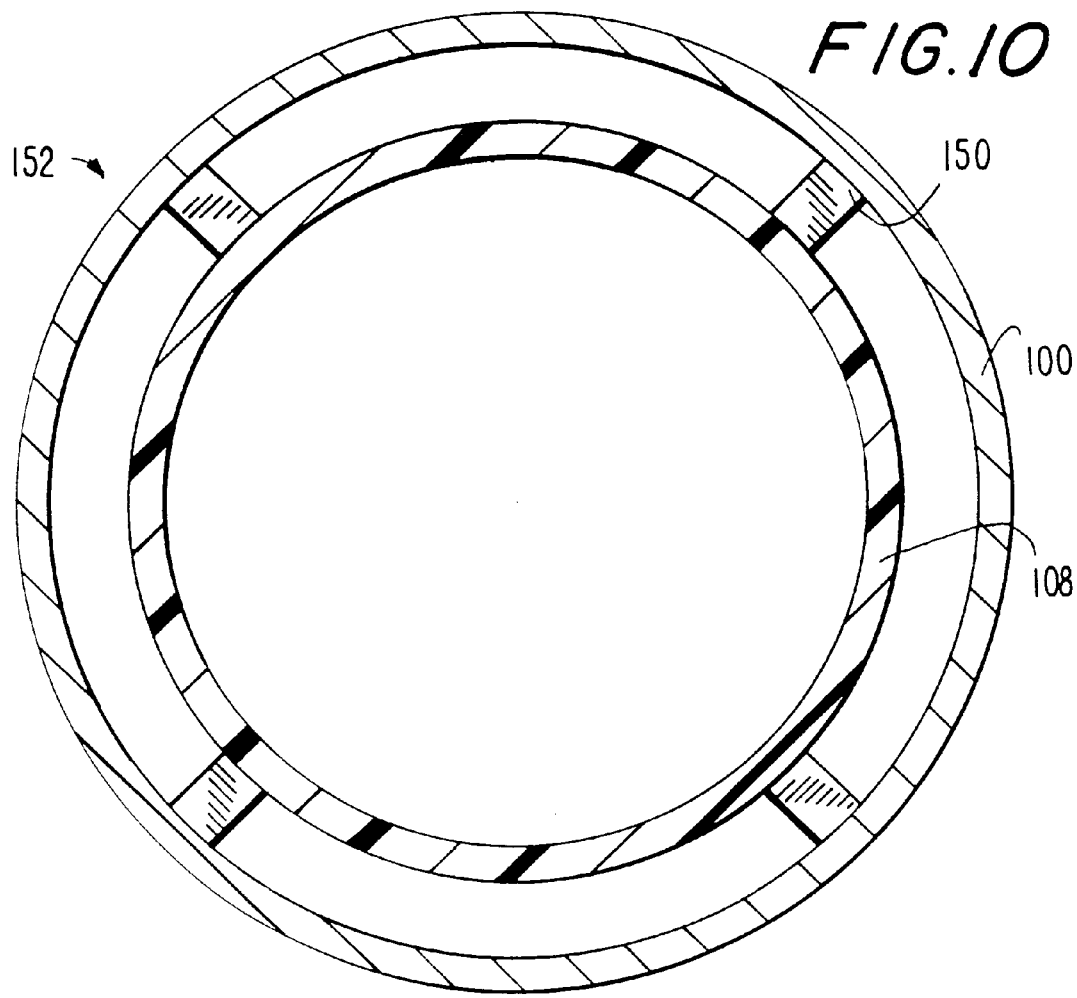
FIG. 10 is a cross sectional view of a dual-containment pipe having the reformed polymeric pipe with spacers inserted into a host pipe in accordance with a preferred embodiment of the invention.

With respect to the dual-containment pipe shown in FIG. 10, although it is disclosed that the lining pipe is deformed at the site of the host pipe and spacer members 150 are attached thereon after deformation, it is within the scope of this invention that spacer members 150 be attached at the extrusion plant before deformation of the pipe. This would enable dual-containment pipe to be manufactured and sold as a pre-fabricated pipe. Further, although four spacer members 150 are shown in FIGS. 9 and 10, it is foreseen that any number of spacer members 101 can be used providing that annular spaces between the host pipe and the lining pipe are maintained. Lastly, spacer members 150 may have continuous lengths equal to the length of the lining pipe rather than short six-inch pieces.

Therefore, although the invention has been described with reference to certain preferred embodiments, it will be appreciated by those skilled in the art of relining existing pipelines that other relining and conversion methods, including other deforming apparatus, may be devised which are nevertheless within the scope and spirit of the invention as defined by the claims appended hereto.

We claim:

1. A method for relining an existing pipeline, comprising the steps of:

deforming a lining pipe having a cylindrical shape to produce a deformed pipe having a deformed shape with a reduced diameter, said deforming step comprising heating said lining pipe to a first temperature at which said lining pipe can be deformed without removing the circular memory of said lining pipe, such that said deformed pipe will return to said cylindrical shape;

inserting said deformed pipe into the existing pipeline;

heating said deformed pipe to a second temperature above said first temperature while applying an internal pressure, such that said deformed pipe expands beyond said cylindrical shape; and cooling said lining pipe to a third temperature below said first temperature while maintaining said internal pressure to set said lining pipe;

wherein only variations in temperature while maintaining said internal pressure are used to reform, expand and set said lining pipe.

2. The method of claim 1, wherein said lining pipe has a wall thickness between ⅛" and ¾" and said first temperature is a function of said wall thickness.

3. The method of claim 2, wherein said first temperature has a range from 110° F. to 150° F.

4. The method of claim 2, wherein said lining pipe has a wall thickness of ⅛" and said first temperature is 110° F.

5. The method of claim 2, wherein said lining pipe has a wall thickness of ¼" and said first temperature is 125° F.

6. The method of claim 2, wherein said lining pipe has a wall thickness of ½" and said first temperature is 142° F.

7. The method of claim 1, wherein said lining pipe comprised a plurality high density polyethylene pipes having a short length joined together by butt fusion, said lining pipe having a length equal to the length of the existing pipeline plus 6 to 8 feet.

8. The method of claim 1, wherein said lining pipe is deformed by applying a gradually increasing external pressure along the length of said lining pipe to form a longitudinal depression therein.

9. The method of claim 8, wherein said external pressure is applied by a series of rollers adjustably angled to gradually converge with said lining pipe.

10. The method of claim 1, wherein said lining pipe has an outside diameter less than the inner diameter of the existing pipeline.

11. The method of claim 10, wherein said reduced diameter is 65–70% of said outside diameter of said lining pipe.

12. The method of claim 1, wherein pressurized steam is inserted into said deformed pipe to heat and apply said internal pressure therein.

13. The method of claim 12, wherein said internal pressure is 20 psi and said second temperature is at least 110% of said first temperature.

14. The method of claim 13, wherein said lining pipe has a length greater than the length of the existing pipeline, the method further comprising maintaining said internal pressure and said second temperature for a period of time computed as a function of said length of said lining pipe.

15. The method of claim 14, wherein said period of time is at least 45 minutes per 100 feet of said lining pipe.

16. The method of claim 12, wherein said lining pipe is cooled by applying compressed air while maintaining said internal pressure.

17. The method of claim 16, wherein said internal pressure is no greater than 30 psi.

18. The method of claim 17, wherein said third temperature is less than 80° F.

19. A method for converting an existing pipeline to a dual-containment pipeline, comprising the steps of:

deforming a lining pipe having a plurality of spacer members attached thereon to produce a deformed pipe having a deformed shape with a reduced diameter by heating said lining pipe to a flex temperature at which said lining pipe can be deformed without removing the circular memory of said lining pipe, such that said deformed pipe will return to said cylindrical shape;

inserting said deformed pipe into the existing pipeline;

heating said deformed pipe to a second temperature above said flex temperature while applying an internal pressure, such that said deformed pipe returns to the shape of said lining pipe; and cooling said lining pipe to a third temperature below said flex temperature while maintaining said internal pressure;

wherein said lining pipe is axially aligned within the existing pipeline to provide an annular space therebetween and only variations in temperature while maintaining said internal pressure are used to reform, expand and set said lining pipe.

20. The method of claim 19, wherein pressurized steam is inserted into said deformed pipe to heat and apply internal pressure therein and compressed air is inserted while maintaining said internal pressure to cool said lining pipe.

21. A method for relining an existing pipeline, comprising the steps of:

deforming a lining pipe having a cylindrical shape to produce a deformed pipe having a deformed shape with a reduced diameter, said deforming step comprising heating said lining pipe to a first temperature at which said lining pipe can be deformed without removing the circular memory of said lining pipe, such that said deformed pipe will return to said cylindrical shape, said deforming step further comprising gradually converging a series of rollers with said lining pipe to apply a gradually increasing pressure to said lining pipe, such that a longitudinal depression is formed therein;

inserting said deformed pipe into the existing pipeline;

heating said deformed pipe to a second temperature above said first temperature while applying an internal pressure, such that said deformed pipe expands beyond said cylindrical shape; and cooling said lining pipe to a third temperature below said first temperature while maintaining said internal pressure to set said lining pipe;

wherein only variations in temperature while maintaining said internal pressure are used to reform, expand and set said lining pipe.

* * * * *

UNITED STATES PATENT AND TRADEMARK OFFICE
CERTIFICATE OF CORRECTION

PATENT NO. : 6,058,978
DATED : May 9, 2000
INVENTOR(S) : Stephen Paletta

It is certified that error appears in the above-identified patent and that said Letters Patent is hereby corrected as shown below:

<u>Title page,</u>

Inventor's listing, delete "; Brian George, 4033 Estabrook Dr., Annandale, Va. 22003; David A. Fletcher, 680 Bedford Rd., Armonk, N.Y. 10504".

Signed and Sealed this

Thirty-first Day of July, 2001

*Attest:*

*Nicholas P. Godici*

*Attesting Officer*

NICHOLAS P. GODICI
*Acting Director of the United States Patent and Trademark Office*